United States Patent
Kientz et al.

(10) Patent No.: US 9,996,559 B2
(45) Date of Patent: Jun. 12, 2018

(54) MAINTENANCE ACTIONS AND USER-SPECIFIC SETTINGS OF THE ATTRIBUTE VALUE DERIVATION INSTRUCTION SET USER INTERFACE

(71) Applicants: Melanie Kientz, Ladenburg (DE); Adelheid Fischer, Walldorf (DE); Andre Klahre, Schwetzingen (DE); Wolfgang Walter, Heidelberg (DE); Thorsten Bender, Ludwigshafen (DE)

(72) Inventors: Melanie Kientz, Ladenburg (DE); Adelheid Fischer, Walldorf (DE); Andre Klahre, Schwetzingen (DE); Wolfgang Walter, Heidelberg (DE); Thorsten Bender, Ludwigshafen (DE)

(73) Assignee: SAP SE, Walldorf (DE)

( * ) Notice: Subject to any disclaimer, the term of this patent is extended or adjusted under 35 U.S.C. 154(b) by 781 days.

(21) Appl. No.: 14/513,482

(22) Filed: Oct. 14, 2014

(65) Prior Publication Data
US 2016/0103857 A1    Apr. 14, 2016

(51) Int. Cl.
*G06F 17/30* (2006.01)
*G06Q 10/00* (2012.01)
*G06F 3/0484* (2013.01)

(52) U.S. Cl.
CPC .... *G06F 17/30289* (2013.01); *G06F 3/04847* (2013.01); *G06F 17/30424* (2013.01); *G06Q 10/00* (2013.01)

(58) Field of Classification Search
CPC ......... G06F 17/30289; G06F 17/30424; G06F 3/0484; G06F 3/04847
See application file for complete search history.

(56) References Cited

U.S. PATENT DOCUMENTS

| | | |
|---|---|---|
| 5,594,858 A | 1/1997 | Blevins |
| 5,651,101 A | 7/1997 | Gotoh et al. |
| 6,028,602 A * | 2/2000 | Weidenfeller ........ G06F 3/0481 715/781 |
| 6,119,122 A * | 9/2000 | Bunnell ................ G06F 9/4443 |
| 6,912,597 B2 | 6/2005 | Sasaki et al. |
| 6,985,898 B1 | 1/2006 | Ripley et al. |
| 7,051,064 B1 * | 5/2006 | Yamagishi ........ G06F 17/30589 707/999.102 |
| 7,330,853 B2 | 2/2008 | Wayt et al. |
| 7,363,315 B2 | 4/2008 | Binder et al. |
| 7,917,538 B2 | 3/2011 | Gurevich |
| 8,635,594 B1 | 1/2014 | Krishnan et al. |
| 8,645,421 B2 | 2/2014 | Meric et al. |

(Continued)

*Primary Examiner* — Robert Beausoliel, Jr.
*Assistant Examiner* — Susan F Rayyan
(74) *Attorney, Agent, or Firm* — Mintz Levin Cohn Ferris Glovsky and Popeo, P.C.

(57) ABSTRACT

A method, a system, and a computer program product for performing maintenance actions and user-specific settings of the attribute value derivation instructions set user interface are disclosed. A maintenance function is provided for changing a target attribute data value corresponding to a source attribute stored in a hierarchical data model. An instruction corresponding to the source attribute is also provided. Using the maintenance function, the target attribute data value is changed. Based on at least one user setting, a user interface for displaying the hierarchical data model and the changed target attribute data value is generated.

20 Claims, 18 Drawing Sheets

(56) References Cited

U.S. PATENT DOCUMENTS

| | | | |
|---|---|---|---|
| 8,768,902 B2* | 7/2014 | Aitken | G06F 17/30306 |
| | | | 707/609 |
| 8,775,280 B2 | 7/2014 | Zech et al. | |
| 2005/0138057 A1* | 6/2005 | Bender | G06F 9/4443 |
| 2006/0247805 A1 | 11/2006 | Thomson et al. | |
| 2006/0271885 A1* | 11/2006 | Pittendrigh | G06F 17/30554 |
| | | | 715/856 |
| 2007/0299704 A1* | 12/2007 | Wildhagen | G06F 8/10 |
| 2009/0012983 A1* | 1/2009 | Senneville | G06F 17/30566 |
| 2010/0023925 A1 | 1/2010 | Shribman et al. | |
| 2012/0194347 A1 | 8/2012 | Kienzle | |
| 2013/0246977 A1* | 9/2013 | Jensen | G06F 17/30572 |
| | | | 715/854 |
| 2014/0006546 A1 | 1/2014 | Pfitzner et al. | |
| 2015/0089385 A1* | 3/2015 | Radhakrishnan | H04L 41/22 |
| | | | 715/745 |
| 2016/0154860 A1* | 6/2016 | Bender | G06F 17/30554 |
| | | | 707/754 |
| 2016/0217202 A1* | 7/2016 | Klahre | G06F 17/30604 |

* cited by examiner

- Default:
  - Source Attribute A: Src. Attrib. Value = 'X1'    Instruction 1   Trg. Attrib. Value 1
    - Source Attribute B: Src. Attrib. Value = 'ABC1'   Instruction 2   Trg. Attrib. Value 1
    - Source Attribute B: Src. Attrib. Value = 'ABC2'   Instruction 4   Trg. Attrib. Value 2
      - Source Attribute C: Src. Attrib. Value = 'K'    Instruction 5   Trg. Attrib. Value 3
      - Source Attribute C: Src. Attrib. Value = 'L'    Instruction 8   Trg. Attrib. Value 3
  - Source Attribute A: Src. Attrib. Value = 'X2'    Instruction 9   Trg. Attrib. Value 1
    - Source Attribute B: Src. Attrib. Value = 'ABC1'   Instruction 3   Trg. Attrib. Value 1
    - Source Attribute B: Src. Attrib. Value = 'ABC3'   Instruction 6   Trg. Attrib. Value 1
      - Source Attribute C: Src. Attrib. Value = 'K'    Instruction 7   Trg. Attrib. Value 4
                                                       Instruction 10

FIG. 4a.

| Source Attribute | Actions | Target Attribute 1 | Target Attribute 2 |
|---|---|---|---|
| ➤ Default Instruction | | | |
| ■ Instruction 1 | | | |
| — Instruction 2 | | | |
| ■ Instruction 3 | | | |
| — Instruction 4 | | | |
| — Instruction 5 | | | |

| Source Attribute | Actions | Target Attribute 1 | Target Attribute 2 |
|---|---|---|---|
| ▶ Default Instruction | ① ② | A | X |
| ■ Product Category: SWEET | ② ③ | A | Y |
| – Product Subcategory: CHOC | ② ③ | A | Y |
| ■ Product Category: DIET | ② ③ | A | X |
| – Product Subcategory: CHOC | ② ③ | B | X |
| – Product Subcategory: CRÈME | ② ③ | B | X |

| Source Attribute | Actions | Target Attribute 1 | Target Attribute 2 |
|---|---|---|---|
| ⮝ Default Instruction | ① ② | | |
| ■ Product Category: SWEET | ② ③ | | Y |
| – Product Subcategory: CHOC | ② ③ | | Y |
| ■ Product Category: DIET | ② ③ | | |
| – Product Subcategory: CHOC | ② ③ | B | |
| – Product Subcategory: CRÈME | ② ③ | B | |

| Source Attribute | Actions | Target Attribute 1 | Target Attribute 2 |
|---|---|---|---|
| ➤ Default Instruction | ① ② | A | X |
| ■ Product Category: SWEET | ② ③ | A | X |
| — Product Subcategory: CHOC | ② ③ | A | X |
| ■ Product Category: DIET | ② ③ | A | X |
| — Product Subcategory: CHOC | ② ③ | A | X |
| — Product Subcategory: CRÈME | ② ③ | A | X |

414

| Source Attribute | Actions | Target Attribute 1 | Target Attribute 2 |
|---|---|---|---|
| ⋏ Default Instruction | ① ② | A | X |
| ■ Product Category: SWEET | ② ③ | A | X |
| – Product Subcategory: CHOC | ② ③ | A | X |
| ■ Product Category: DIET | ② ③ | A | X |
| – Product Subcategory: CHOC | ② ③ | B | X |
| – Product Subcategory: CRÈME | ② ③ | B | X |

| Source Attribute | Actions | Target Attribute 1 |
|---|---|---|
| ➤ Default Values | | |
| ■ Src. Attrib. A: Src.Attrib.Value 1 {Descr A} | | |
| — Src. Attrib. B: Src.Attrib.Value 2 {Descr B} | | |
| ■ Src. Attrib. A: Src.Attrib.Value 3 {Descr C} | | |
| — Src. Attrib. B: Src.Attrib.Value 2 {Descr B} | | |
| — Src. Attrib. B: Src.Attrib.Value 4 {Descr D} | | |

| Source Attribute | Source Attribute Value | Description | Actions | Target Attribute 1 |
|---|---|---|---|---|
| ▶ Default Values | | | | |
| ▪ Src. Attrib. A | Src.Attrib.Value 1 | Descr A | | |
| — Src. Attrib. B | Src.Attrib.Value 2 | Descr B | | |
| ▪ Src. Attrib. A | Src.Attrib.Value 3 | Descr C | | |
| — Src. Attrib. B | Src.Attrib.Value 2 | Descr B | | |
| — Src. Attrib. B | Src.Attrib.Value 4 | Descr D | | |

FIG. 5c.

| Source Attribute | Description | Actions | Target Attribute 1 |
|---|---|---|---|
| ▼ Default Values | | | |
| ■ Src. Attrib. A: Src.Attrib.Value 1 | Descr A | | |
| — Src. Attrib. B: Src.Attrib.Value 2 | Descr B | | |
| ■ Src. Attrib. A: Src.Attrib.Value 3 | Descr C | | |
| — Src. Attrib. B: Src.Attrib.Value 2 | Descr B | | |
| — Src. Attrib. B: Src.Attrib.Value 4 | Descr D | | |

506

| Source Attribute | Actions | Target Attribute 1 |
|---|---|---|
| ➤ Default Values | | |
| ■ Src.Attrib.Value 1 | | |
| – Src.Attrib.Value 2 | | |
| ■ Src.Attrib.Value 3 | | |
| – Src.Attrib.Value 2 | | |
| – Src.Attrib.Value 4 | | |

| Source Attribute | Actions | Target Attribute 1 |
|---|---|---|
| ▸ Default Values | | |
| ■ Product Category: SWEET (Sweet Cookies) | | |
| — Product Subcategory: CHOC (Chocolate) | | |
| ■ Product Category: DIET (Diet Cookies) | | |
| — Product Subcategory: CHOC (Chocolate) | | |
| — Product Subcategory: CREME (Creme) | | |

| Source Attribute | Source Attribute Value | Description | Actions | Target Attribute 1 |
|---|---|---|---|---|
| ▼ Default Values | | | | |
| ■ Product Category | SWEET | Sweet Cookies | | |
| — Product Subcategory | CHOC | Chocolate | | |
| ■ Product Category | DIET | Diet Cookies | | |
| — Product Subcategory | CHOC | Chocolate | | |
| — Product Subcategory | CREME | Creme | | |

MAINTENANCE ACTIONS AND USER-SPECIFIC SETTINGS OF THE ATTRIBUTE VALUE DERIVATION INSTRUCTION SET USER INTERFACE

TECHNICAL FIELD

This disclosure relates generally to data processing and, in particular, to providing various maintenance and user-specific settings of an attribute value derivation instruction set.

BACKGROUND

In today's world, data is vital to operations of many businesses, whether large or small. On regular basis, businesses rely, use, process and/or store vast amounts of data that can be related to businesses' finances, operations, logistics, customers, and many other aspects of their operations. Proper storage of data and fast access to such data are important to smooth operations of the businesses.

Typically, data is stored using hierarchical data models. A hierarchical data model can be a data model that organizes data into a tree-like structure. The data can be stored as records that are connected using links. In some cases, a record can include a collection of fields containing only one value, where the fields can be defined by an entity type. Typically, the hierarchical data model can include parent records and child records (or nodes), where each child record can have only one parent and each parent can have one or more child records. To retrieve data from a hierarchical database, it is necessary to traverse the entire tree beginning with the root node. This process can be compute intensive and time consuming. Thus, there is a need to provide an ability to obtain and display data in accordance with user preferences that does not create a significant computing burden.

SUMMARY

In some implementations, the current subject matter relates to a computer-implemented method for performing maintenance actions and user-specific settings of the attribute value derivation instructions set user interface. The method can include providing at least one maintenance function to change at least one target attribute data value corresponding to at least one source attribute stored in a hierarchical data model and at least one instruction corresponding to at least one source attribute, changing, using at least one maintenance function, at least one target attribute data value, and generating, based on at least one user setting, a user interface for displaying the hierarchical data model and the changed target attribute data value. At least one of the providing, the changing, and the generating can be performed using at least one processor of at least one computing system.

In some implementations, the current subject matter can include one or more of the following optional features. At least one maintenance function can include at least one of the following: an action to clear a data value of a target attribute corresponding to a root source attribute contained in the hierarchical data model, an action to apply a data value to at least one target attribute corresponding to at least one source attribute contained on a lower level in the hierarchical data model, and an action to apply at least one inherited data value to at least one target attribute, wherein the inherited data value is inherited from at least another target attribute corresponding to at least another source attribute contained on a higher level of the hierarchical data model.

In some implementations, at least one source attribute in the hierarchical data model can be defined by a source attribute value and a source attribute description. The generated user interface can include at least one of the following: at least one source attribute, the source attribute value corresponding to the source attribute, and the source attribute description corresponding to the source attribute. At least one column in the generated user interface can be used to display at least one of the following: at least one source attribute, the source attribute value corresponding to at least one source attribute, and the source attribute description corresponding to at least one source attribute.

In some implementations, the method can also include searching at least one of the following: at least one source attribute, the source attribute value corresponding to the source attribute, and the source attribute description corresponding to the source attribute. The search can be limited by the hierarchical data model as displayed in the generated user interface.

In some implementations, the method can further include adding and/or removing at least another user setting for displaying the hierarchical data model and the changed target attribute data value without changing coding associated with the generated user interface.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary user interface containing an attribute value derivation instruction set and corresponding to the tree structure shown in FIG. 2, according to some implementations of the current subject matter;

FIG. 4a illustrates an exemplary user interface of the attribute value derivation instruction set, according to some implementations of the current subject matter;

FIGS. 4b-4e illustrate exemplary user interfaces showing effects of actions in the attribute value derivation instruction set, according to some implementations of the current subject matter;

FIGS. 5a-5d illustrate exemplary user interfaces in accordance with various display options, according to some implementations of the current subject matter;

FIGS. 6a and 6b illustrate exemplary user interfaces for displaying data using various display options, according to some implementations of the current subject matter;

FIG. 8 illustrates an exemplary user interface that can allow the user to perform searching of specific source attribute values using a particular search parameter, according to some implementations of the current subject matter;

DETAILED DESCRIPTION

To address these and potentially other deficiencies of currently available solutions, one or more implementations of the current subject matter provide methods, systems, articles or manufacture, and the like that can, among other possible advantages, provide for a user interface for implementing maintenance actions and user-specific settings of the attribute value derivation instruction set.

Figure 1:
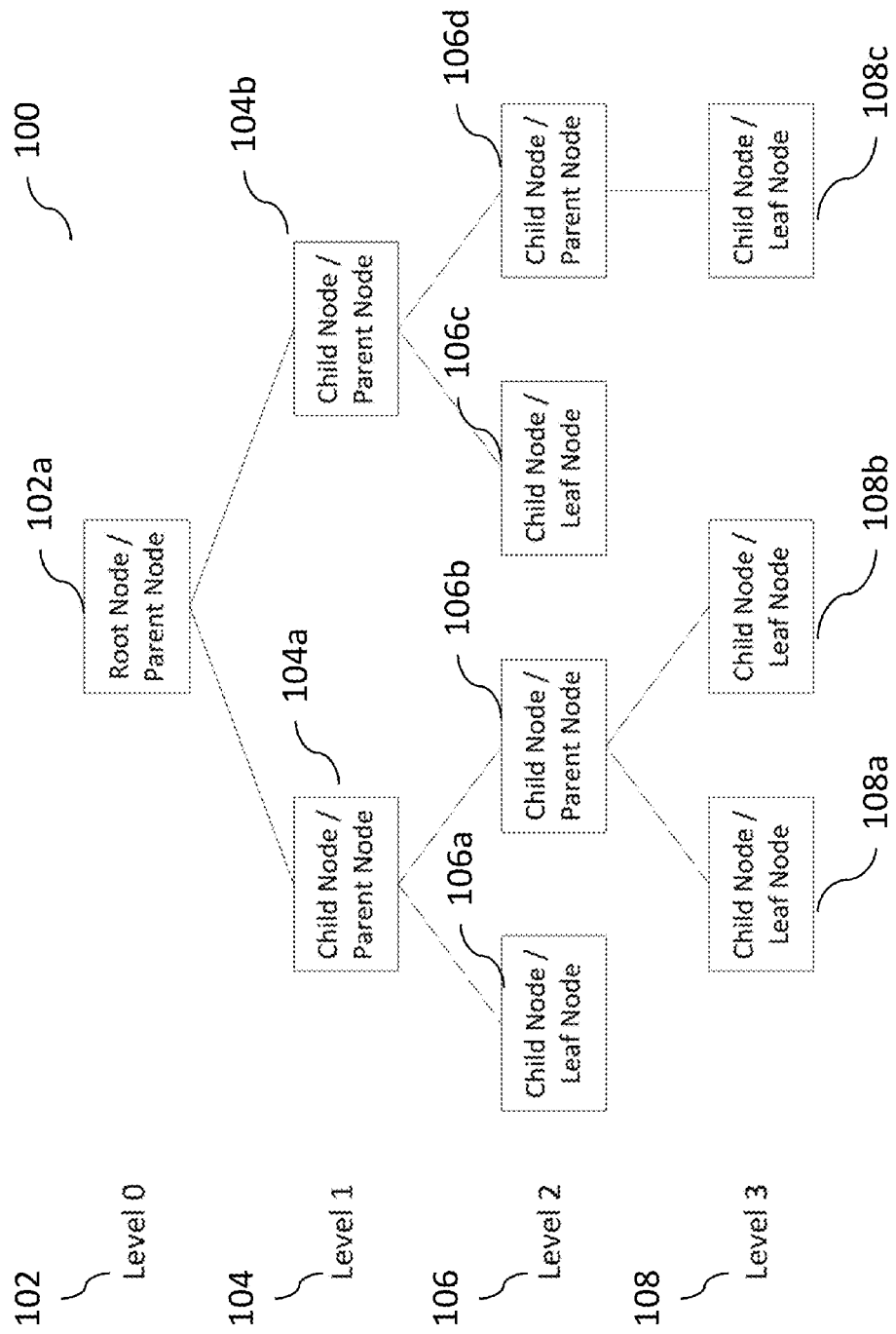
FIG. 1 illustrates an exemplary hierarchical data model, according to some implementations of the current subject matter.

In some implementations, the current subject matter relates to hierarchical data models and ability to maintain attribute values of data stored using a hierarchical data model using an attribute value derivation tool. A hierarchical data model can be a data model in which the data is represented in a tree structure. The elements of the hierarchical data model can be represented by nodes. FIG. 1 illustrates an exemplary hierarchical data model 100, according to some implementations of the current subject matter. The data model 100 can include a plurality of levels 102-108 (i.e., level 0 102, level 1 104, level 2 106, and level 3 108). The data model 100 can allow storage of data at different levels, where the data can be stored in a plurality of nodes. For example, level 0 can include a root or parent node 102a; level 1 can include child nodes/parent nodes 104a and 104b; level 2 can include child nodes/parent nodes 106b, 106d and child nodes/leaf nodes 106a and 106c; level 3 can include child nodes/leaf nodes 108a, 108b, and 108c. A root node 102 typically does not have any parent nodes. A child node can include a parent node and can also include child nodes of its own. A leaf node does not have any child nodes. A child node typically inherits data attributes associated with data that is stored in its parent, grandparent, etc. nodes as well as the root node of the model. Hence, the child node/leaf node 108a can inherit attributes associated with the child node/parent node 106b, child node/parent node 104a, and the root node/parent node 102a.

The nodes in the data model 100 can be connected by branches that can represent parent-child relationship of the nodes. Each parent node can have many child nodes, but each child node has only one parent node. In some implementations, in the data mode, the level can be defined by a hierarchy of nodes and a number of the nodes from the root node down to the leaf nodes. Thus, the level 102 of the root node 102a can be defined as a '0' level; the level 104 of the child nodes 104a-b of the root node 102a can be defined as a level '1'; the level 106 of the child nodes 106a-d of the parent node level 104 can be defined as a level 2; and the level 108 of the child nodes 108a-c of the parent node level 106 can be defined as a level 3.

The attribute value derivation tool can be a generic and reusable tool for rule-based mapping and derivation of data. It can be based on rules for mapping and deriving values for target attributes based on values of source attributes and based on an inheritance logic, which uses default values. The attribute value derivation can provide a user interface to maintain values for the target attributes in a hierarchical set of rules, also called instructions. The values for the target attributes can be defined in a hierarchical set of instructions based on source attribute value combinations of the source attribute hierarchy. The tree structure can include any number of rules.

In some implementations, the current subject matter can provide a user interface that can allow a user to perform various maintenance functions and/or data manipulations of data stored in the hierarchical data model. These functions can effectuate changes of attribute values in the hierarchy of source attribute value combinations. Further, the user interface can provide an overview of the attribute values and the source attribute value combinations of the source attribute hierarchy.

Figure 2:
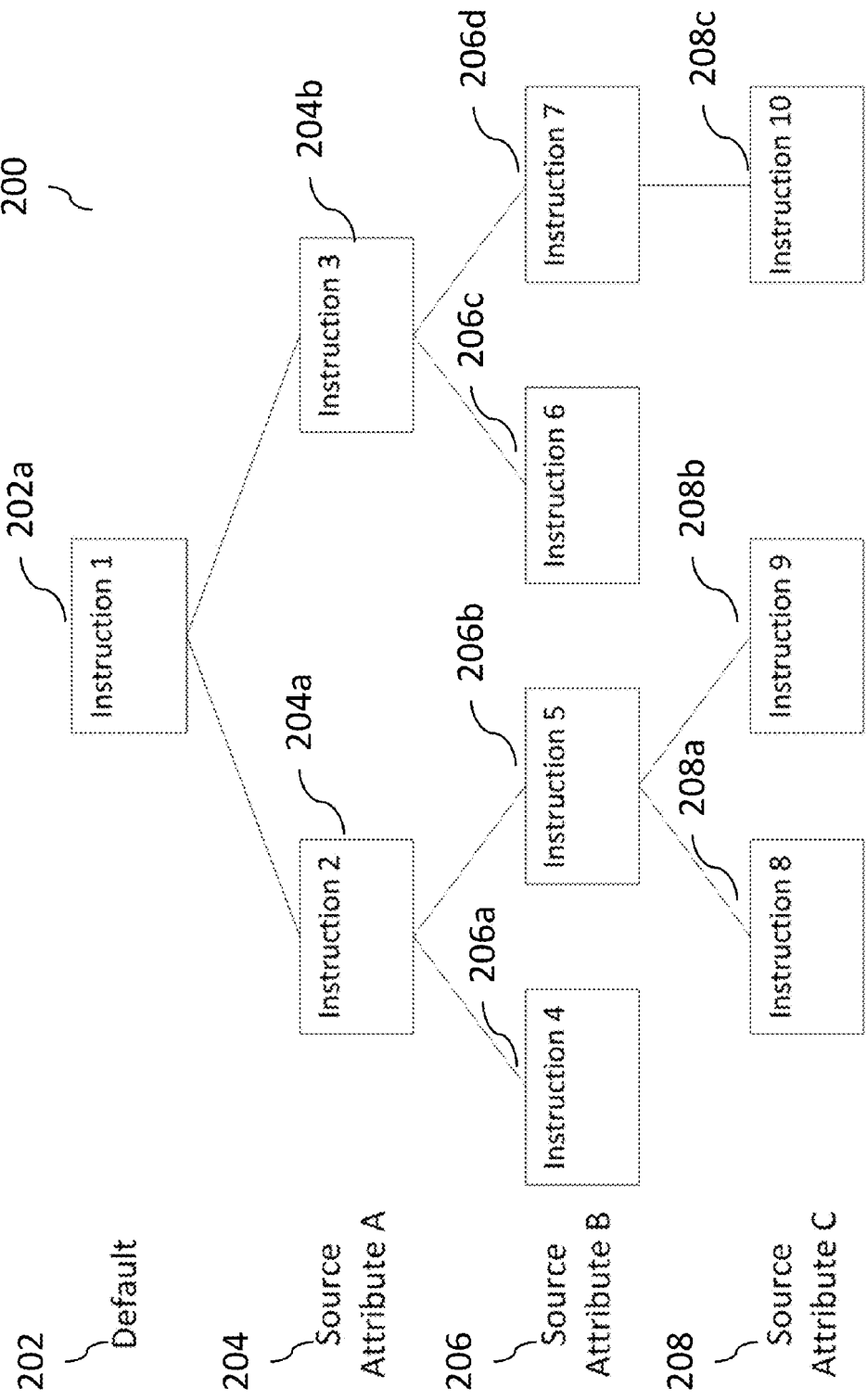
FIG. 2 illustrates an exemplary source attribute hierarchy, according to some implementations of the current subject matter.

FIG. 2 illustrates an exemplary source attribute hierarchy 200, according to some implementations of the current subject matter. The hierarchy 200 can include a default level 202, a source attribute A level 204, a source attribute B level 206, and a source attribute C level 208. The hierarchy can include any number of levels. At each level, there can exist a number of rules or instructions, where child level instructions inherit parent level instructions. As shown in FIG. 2, the default level 202 can include an instruction 1 202a; level 204 can include instruction 2 204a and instruction 3 204b; level 206 can include instruction 3 206a, instruction 4 206b, instruction 5 206c, and instruction 7 206d; level 208 can include instruction 8 208a, instruction 9 208b, and instruction 10 208c. As shown in this figure, instruction 8 208a can inherit instruction 5, instruction 2 and instruction 1. In some implementations, source attributes can be defined in a hierarchy where each level consists of a source attribute to group source attribute value combinations based on a specific value or a grouping such as a selection of source attribute values to individually generate groups of source attribute value combinations.

In some implementations, values for target attributes can be defined in a hierarchical set of instructions, which can be also referred to as an attribute value derivation instruction set ("AVD instruction set"). The definitions of the target attributes can be based on source attribute value combinations of the source attribute hierarchy. Each value of a target attribute of the instruction can be defined by a specific or an explicit value, a reference to a source attribute, or, alternatively can be determined based on a function.

This value can be directly maintained. If it is not directly maintained, then this value can be inherited by the corresponding value of the instruction of the upper level of the source attribute hierarchy. As shown in FIG. 2, the AVD instruction set can include an instruction 202a including overall default values, which can be independent of the values of the source attributes. The AVD instruction set can further include a hierarchical data model where the source attributes (including the groupings) can define a level of the tree (202-208) and the instruction(s) with the source attribute value combinations can define the nodes of the tree (202a-208c). The root node 202a can also be called the default instruction.

FIG. 3 illustrates an exemplary user interface 300 containing an attribute value derivation instruction set and corresponding to the tree structure 200 shown in FIG. 2, according to some implementations of the current subject matter. The user interface 300 illustrates a tree structure where the source attributes (and/or groupings) can define a level of the tree 200 and the source attribute value combinations and the assigned instruction can define the nodes of the tree 200. The assigned instructions can also define target attribute values (by a directly maintained value (highlighted in bold) or by an inherited value). For example, a directly maintained value can be a target attribute value 1 ("Trg. Attrib. Value 1") corresponding to the default instruction 202a. The directly maintained value can also be target attribute value 2 ("Trg. Attrib. Value 2"), target attribute value 3 ("Trg. Attrib. Value 3"), and target attribute value 4 ("Trg. Attrib. Value 4"). Target attribute value 2 can be defined by instruction 4 206a (as shown in FIG. 2) and can be based on the source attribute B 206 that defines a source attribute value of "ABC1". Target attribute value 3 can be defined by instruction 5 206b (as shown in FIG. 2) and can be based on the source attribute B 206 that defines a source attribute value of "ABC2". Target attribute value 4 can be defined by instruction 10 208c (as shown in FIG. 2) and can be based on the source attribute C 208 that defines a source attribute value of "K". Other target attribute values can be inherited attribute values. For example, a target attribute value defined by instruction 2 204a can be based on the source attribute A having a source attribute value of "X1". Examples of other inherited attribute values are shown in FIG. 3.

As stated above, in some implementations, the current subject matter's user interface can provide various maintenance functions to the user that can allow the user to easily change target attributes values upon selecting a specific instruction as well as corresponding related instructions based on an inheritance logic associated with the hierarchical data model. These functions can be referred to as maintenance functions. The user interface can further provide an ability to customize displaying of the hierarchy of the source attribute value combinations using different options that can define if and how to display source attribute names, source attribute values and their descriptions. These can be referred to as user-specific settings.

In some implementations, maintenance functions can allow changing of the target attribute values in the tree of the source attribute value combinations. These actions can be applied to all target attribute values of an instruction and can further modify inherited values of the corresponding instructions in the lower levels. In some implementations, the maintenance functions can include an action to clear values of a default instruction (hereinafter, "first action"), an action to apply values to lower levels (hereinafter, "second action"), and an action to use inherited values (hereinafter, "third action").

In some implementations, an action to clear the values of the default instruction can be applicable to the default instruction in the tree only. This action can clear values of the target attributes of the default instruction to initial values. The initial values can be passed on to the lower levels based on the inheritance logic, and hence, inherited by the lower level instructions.

In some implementations, an action to apply values to lower levels can be applicable to all levels in the tree. This action can populate values of target attributes of a selected instruction to all instructions of all lower levels of the given instruction. By populating values to all instructions existing at the lower levels, this action can further clear existing directly maintained values. Attribute values of the selected instruction can be further passed on to the lower levels based on the inheritance logic, and hence, inherited by the lower level instructions.

In some implementations, an action to use inherited values can be applicable to all levels, except the default instruction level. This action can clear directly maintained values of target attributes of a specific instruction, which can allow corresponding values of the target attributes of the corresponding upper level instruction(s) to receive a valid value for that specific instruction as inherited values.

Performance of the above actions can be dependent on the inheritance logic contained within the attribute value derivation instruction set. Using these actions, the user can be provide with an ability to easily change attribute values in the hierarchy of source attribute value combinations. The actions can call corresponding methods within the attribute value derivation. The methods can use recursive logic to change attribute values of selected instruction(s) and attribute values of the corresponding lower level instruction(s) based on the inheritance logic of the attribute value instruction set.

FIG. 4a illustrates an exemplary user interface of the attribute value derivation instruction set 400, according to some implementations of the current subject matter. The instructions in the instruction set can be similar to the hierarchy 200 shown in FIG. 2. The user interface 400 can include a source attribute identification of instructions column 402, an actions column 404, and columns 406, 408 containing target attribute identification.

As shown in FIG. 4a, the default instruction can correspond to the first and second actions (designated by "1" and "2" in FIG. 4a), discussed above. As stated above, the first action (i.e., an action to clear values) can be available only in connection with the default instruction. Instruction 1 shown in FIG. 4a can correspond to the second and third actions (designated by "2" and "3" in FIG. 4a). Other instructions (i.e., instructions 2-5) can be similarly associated with second and third actions.

FIGS. 4b-4e illustrate exemplary user interfaces 410-416, respectively, that illustrate effects of the above actions, according to some implementations of the current subject matter. As stated above, upon being called, these actions can implement the changes to target attributes in accordance with the selected instruction(s) as well as the related lower level instructions.

FIG. 4b illustrates an exemplary user interface 410 that includes source attributes associated with various instructions and corresponding actions and resulting target attributes (target attributes 1 and 2). As shown in FIG. 4b, there can exist several directly maintained target attribute values for the target attributes 1 and 2 at the default instruction and at some levels of the Product Category (corresponding to "SWEET") as well as Product Subcategory level (corresponding to "CHOC"). The directly maintained target attribute 1 corresponding to the default instruction is "A"

(shown in bold face lettering) and the directly maintained target attribute 2 for the default instruction is "X" (also shown in bold face lettering). Additionally, in the Product Subcategory "CHOC", under the Product Category "DIET", the directly maintained target attribute 1 is "B" (shown in bold face lettering). Additionally, for Product Category "SWEET" the directly maintained target attribute 1 is "Y". These values can be inherited to the corresponding lower levels, i.e., Product Category and Product Subcategory (these values are show in italics lettering in FIG. 4*b*).

FIG. 4*c* illustrates an exemplary user interface 412 that shows results of executing the first action on the target attribute data shown in FIG. 4*b*, according to some implementations of the current subject matter. After the first action is executed, target attribute values ("A" and "X") corresponding to the default instruction are cleared. Since, these values are inherited by the instructions contained at lower levels, the values of those instructions are initialized/cleared as well. The values of target attributes that are not inherited (i.e., target attribute 2 "Y" and target attribute 1 "B") remain shown.

FIG. 4*d* illustrates an exemplary user interface 414 that shows results of executing the second action (i.e., apply values to lower levels) on the target attribute data shown in FIG. 4*b*, according to some implementations of the current subject matter. After execution of the second action for the default instruction, target attribute values of this instruction are populated to the corresponding lower levels. The directly maintained values of the lower levels are cleared. Hence, after execution of the second action, the values for the target attribute 1 in the Product Categories and Product Subcategories become equal to A. Similarly, the values for the target attribute 2 in the Product Categories and Product Subcategories (except the default instruction) become equal to X.

FIG. 4*e* illustrates an exemplary user interface 416 that shows results of execution of the third action (i.e., use inherited values on all levels except default instruction), according to some implementations of the current subject matter. The third action is being executed on the values shown in the user interface 410 shown in FIG. 4*b*. After executing the third action on the instruction for the Product Category SWEET, target attribute values of this instruction are cleared and target attribute values of the corresponding upper level instructions are assigned valid values for this instruction. Thus, after execution of the third action, the values for the target attribute 1 in the Product Categories SWEET and DIET become equal to A and in the Product Subcategories CHOC and CREME (under Product Category DIET) remain as B. The target attribute 2 becomes equal to X in all Product Categories and Product Subcategories.

In some implementations, the current subject matter can allow for implementations of various user-specific settings that can configure data searches as well as display of data in a user interface. In that regard, the user-specific settings can influence behavior and visualization of the user interface. In some implementations, these settings can affect how source attributes, source attribute values, source attribute descriptions, and other information is presented on the user interface. Further, some data can be highlighted if so desired. The settings can further optimize search algorithms that can be used to search and/or filter data in the data model. Additionally, the settings can further provide various enhancements to the user interface to improve overall user experience.

As stated above, the attribute value derivation instruction set can include a hierarchy of source attribute value combinations of the source attribute hierarchy. In some implementations, the user interface corresponding to the instruction set can be customized to show various aspects relating to source attributes of source attribute hierarchy, source attribute value combination(s) and/or descriptions of source attributes. Further, the user interface can be customized using different display options. These options can include definitions and/or descriptions of source attribute names, definitions of source attribute value combination(s) and/or source attributes. Additionally, the user interface can be further customized to display this data in one, two, three, and/or more columns and/or in any other fashion. This customization of the user interface can be tailored to user's individual needs and/or preferences.

In some implementations, the current subject can provide the following display options for the above data. The options can include:
  Option 1: One Column (Attribute: Value {Description})
  Option 2: Three Columns (Attribute|Value|Description)
  Option 3: Two Columns (Attribute: Value|Description)
  Option 4: One Column (Attribute: Value)
  Option 5: Two Columns (Attribute|Value)
  Option 6: One Column (Value {Description})
  Option 7: Two Columns (Value|Description)
  Option 8: One Column (Attribute)
  Option 9: One Column (Value)

In the above designations, the "|" element can indicate a separate column and "{" and "}" can indicate bracket signs. Other options can be possible and the data can be display in any fashion as desired by the user. FIGS. 5*a*-5*d* illustrate exemplary user interfaces in accordance with the display options listed above.

FIG. 5*a* can correspond to user interface 502 that displays data in accordance with option 1 (i.e., One Column (Attribute: Value {Description})). The user interface includes a source attribute column, an actions column, and a target attribute 1 column, the latter corresponding to the option 1's display of a single column. The source attribute column can include a hierarchical data model that includes a root node of "Default Values", child nodes of source attribute value A (i.e., "Src. Attrib. A: Src.Attrib.Value1 {Descr A}" and "Src. Attrib. A: Src.Attrib.Value3 {Descr C}") and grandchild nodes of source attribute value B (i.e., "Src. Attrib. B: Src.Attrib.Value2 {Descr B}" and "Src. Attrib. A: Src.Attrib.Value4 {Descr D}"). The "Src. Attrib. A" and "Src. Attrib. B" can represent names of the source attributes. The "Src.Attrib.Value1", "Src. Attrib.Value2", etc. can represent values of the source attributes. The "Descr A", "Descr B", etc., can represent descriptions of the source attribute values, e.g., "Descr A" can be a description of the source attribute value 1.

FIG. 5*b* can correspond to user interface 504 that displays data in accordance with option 2 (i.e., Three Columns (Attribute|Value|Description)). As illustrated, the user interface can include a source attribute column, a source attribute value column, a description column, an actions column, and a target attribute 1 column, the first three of which corresponding to the three columns required in option 2. In this example, the data shown in FIG. 5*a*'s source attribute column is split between the above three columns. Thus, the source attribute column contains the root node, the child nodes, and the grandchild nodes identified above (i.e., "Default Values", "Src. Attrib. A", "Src. Attrib. B"). The source attribute value column can include the source attribute values (i.e., "Src.Attrib.Value1", "Src.Attrib.Value2", "Src.Attrib.Value3", "Src.Attrib.Value4"). The description column can include descriptions of the source attributes (i.e., "Descr A", "Descr B", "Descr C", "Descr D").

FIG. 5c can correspond to user interface 506 that displays data in accordance with option 3 (i.e., Two Columns (Attribute: Value I Description)). As shown, the user interface can include a source attribute column, a description column, an actions column, and a target attribute 1 column, the first two of which corresponding to the two columns required in option 3. FIG. 5a's source attribute column is split between the two columns indicated above. Thus, the source attribute column contains the root node, the child nodes, and the grandchild nodes identified above (i.e., "Default Values", "Src. Attrib. A", Src. Attrib. B"). Additionally, the source attribute column can include corresponding source attribute values (i.e., "Src.Attrib.Value1", "Src.Attrib.Value2", "Src.Attrib.Value3", "Src.Attrib.Value4"). The description column can include descriptions of the source attributes (i.e., "Descr A", "Descr B", "Descr C", "Descr D").

FIG. 5d can correspond to user interface 508 that displays data in accordance with option 3 (i.e., One Column (Value)). As shown, the user interface can include a source attribute column, an actions column, and a target attribute 1 column. Again, FIG. 5a's source attribute data is being used to illustrate how the data can be displayed using this option 9. In this case, the source attribute column can include only the source attribute values (i.e., "Src.Attrib.Value1", "Src.Attrib.Value2", "Src.Attrib.Value3", "Src.Attrib.Value4") that can be listed in a hierarchical order in accordance with the source attributes' hierarchy.

FIGS. 6a and 6b illustrate exemplary user interfaces for displaying exemplary data using options 1 and 2, respectively. In the user interface using option 1's user settings (as shown in FIG. 6a), the data concerning source attributes, source attribute values and source attribute descriptions is displayed in a single column. The source attribute names are "Product Category" and "Product Subcategory". The source attribute values are "SWEET" (with description "Sweet Cookies") and "DIET" (with description "Diet Cookies") for the source attribute "Product Category". Further, the source attribute values are "CHOC" (with description "Chocolate") and "CRÈME" (with description "Crème") for the source attribute "Product Subcategory".

As shown in FIG. 6b, option 2 is used to display exemplary data, where the source attributes, source attribute values, and source attribute descriptions are split between three different columns. Thus, the source attribute column can include source attributes of "Product Category" and "Product Subcategory". The source attribute value column can include values of "SWEET", "CHOC", "DIET", and "CRÈME". The source attribute description column can include descriptions of "Sweet Cookies", "Chocolate", "Diet Cookies", and "Crème". This data can be displayed in a different fashion if other options are used.

Figure 7:
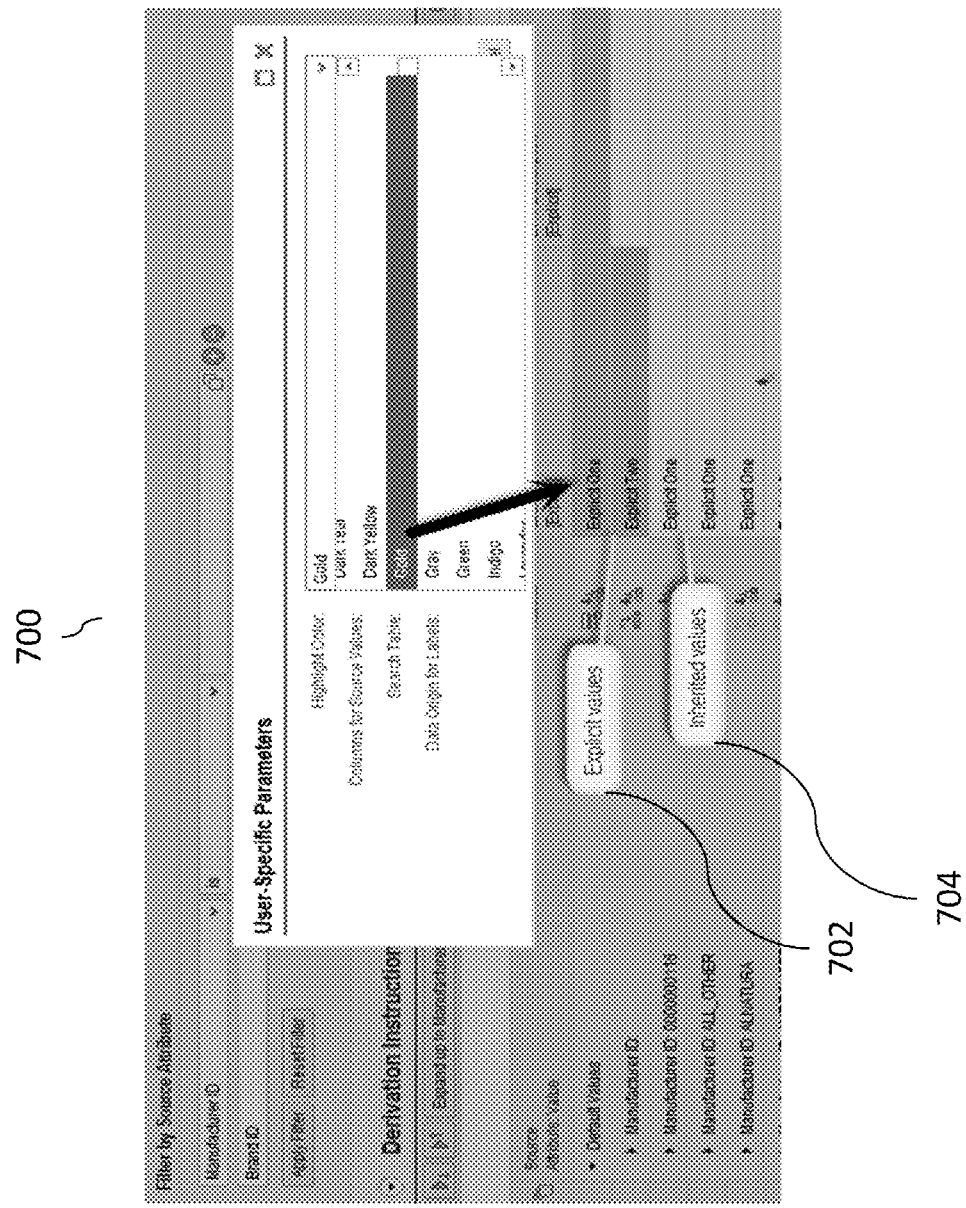
FIG. 7 illustrates an exemplary user interface that includes explicit values that are being highlighted and inherited values that are not being highlighted, according to some implementations of the current subject matter.

In some implementations, the user may desire to distinguish between different types of source attributes by highlighting different types of attributes using different colors, patterns, schemes, or in any other fashion. The user can visually differentiate between values that were maintained explicitly and values that were inherited from a higher hierarchy node. FIG. 7 illustrates an exemplary user interface 700 that includes explicit values 702 that are being highlighted and inherited values 704 that are not being highlighted. The user can use any scheme to highlight the desired values.

In some implementations, the current subject matter can allow optimization of data searching algorithms of the attribute hierarchy. In some cases, the data that the user is working with can be very large (e.g., high data volume) and to determine a whole hierarchy of that data may be compute intensive and time consuming. Thus, the current subject matter can determine and load only the hierarchy data that is desired by the user and/or visible to the user, i.e. only the expanded nodes in the tree, if the user expand further the data is loaded "on demand" from the backend layer.

The implication for the search functionality is that not all relevant data might be available on the frontend layer where the search is executed. Since loading this data automatically can result in long wait times for the user (which can involve performance intensive backend determinations) and the user might not even want to search the "non-visible" data, the user-settings can provide a parameter that can allow the user to specify whether the hierarchy should be loaded upon a search completely or if the search shall be executed only on the already loaded data. This can allows the user to customize user interface behavior based on user's business requirements and/or user preference concerning the relevance of visible/non-visible data.

Figure 8:
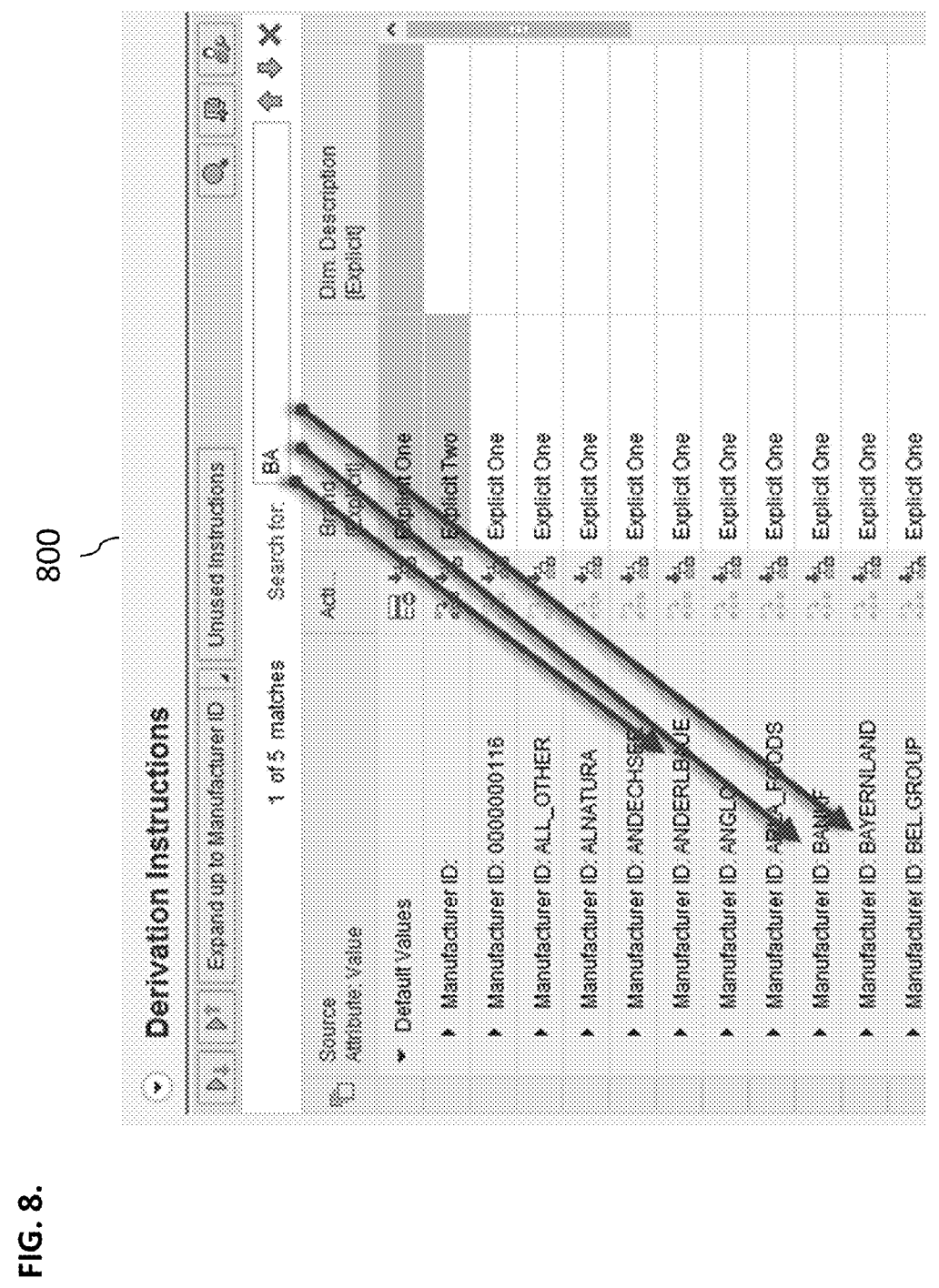

FIG. 8 illustrates an exemplary user interface 800 that can allow the user to perform searching values in all source attributes values using a particular search parameter ("BA"). As indicated by the arrows in FIG. 8, upon entry of the search parameter "BA", three source attribute values can be identified in this example. These source attribute values can be identified without expanding the whole data hierarchy. Depending on the setting, this search can also be used to search for the parameter "BA" in all other levels below the visible source attributes (in this example: "Manufacturer"). For example, a lower level source attribute can have a value "BAXX", then this source attribute value can also be highlighted (and the tree can be expanded accordingly) even if the tree was initially only expanded to the upper level (in this example: "Manufacturer", as shown in the diagram).

In some implementations, the user interface can be modified without altering existing standard coding. The current subject matter can include an enhancement mechanism that can allow addition and/or removal of settings that might be relevant for the customer's business case. In some implementations, the user interface can be rendered dynamically based on the customer's decision of required parameters.

Figure 9:
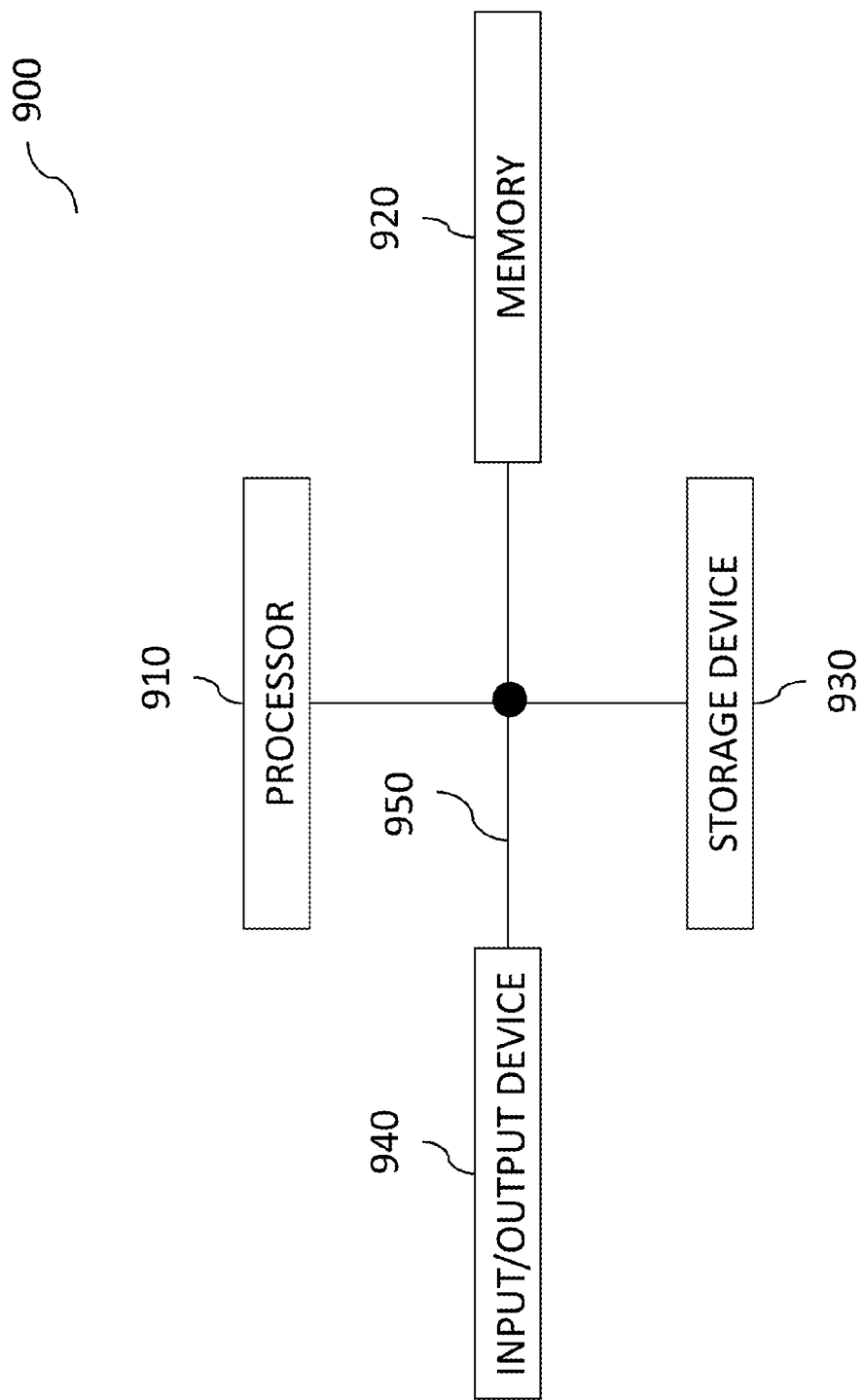
FIG. 9 is an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
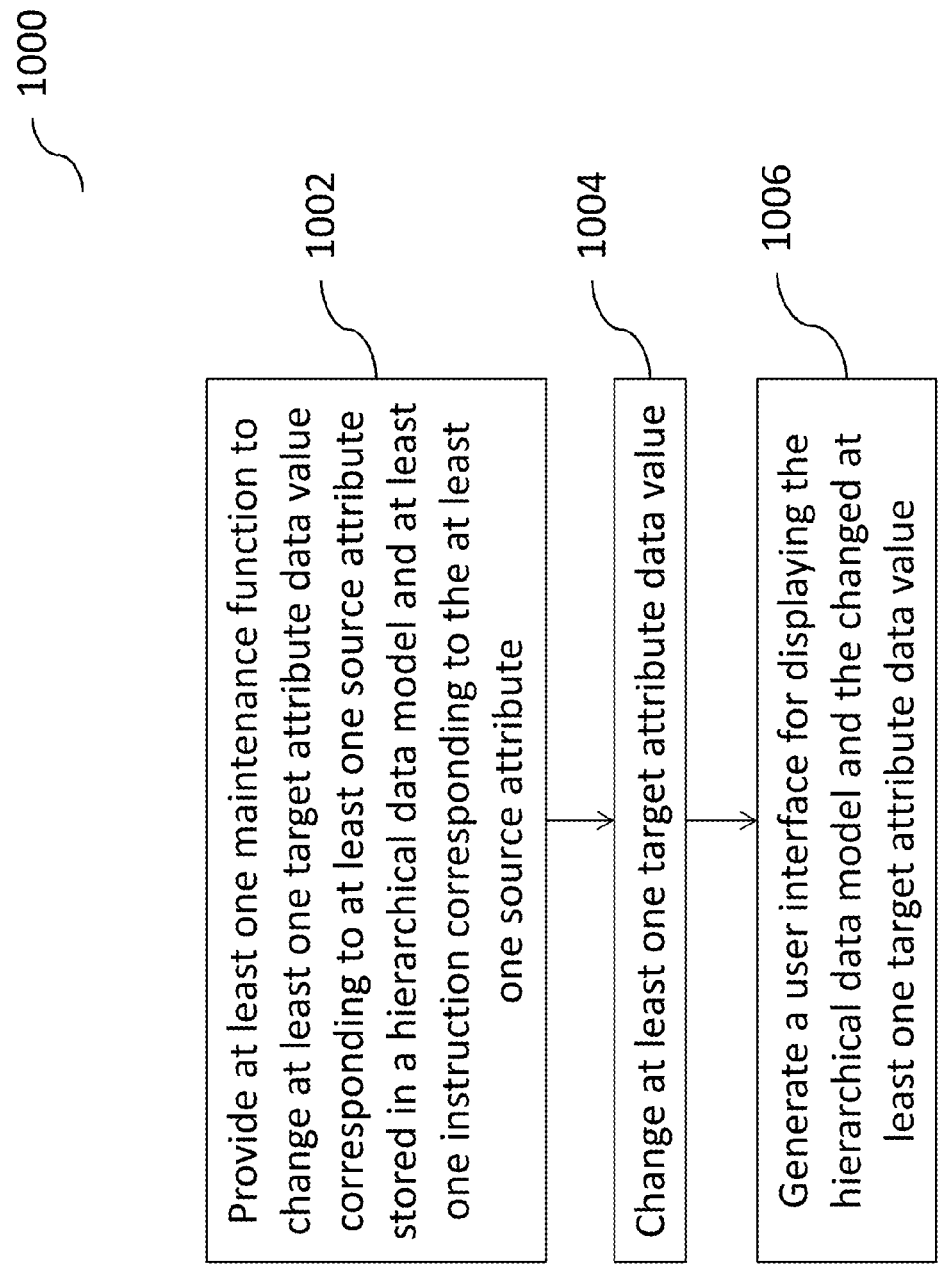
FIG. 10 is an exemplary method, according to some implementations of the current subject matter.

FIG. 10 illustrates an exemplary method 1000 for using various maintenance functions in hierarchical data model to change target attribute values, according to some implementations of the current subject matter. At 1002, at least one maintenance function can be provided. The maintenance function can be used to change a target attribute data value that can correspond to a source attribute stored in the hierarchical data model and an instruction corresponding to the source attribute. At 1004, the maintenance function can be used to change the target attribute data value. At 1006, a user interface can be generated to display the hierarchical data model and the changed target attribute data value. In some implementations, the user interface can be generated based on various user settings.

In some implementations, the current subject matter can include one or more of the following optional features. The maintenance function can include at least one of the following: an action to clear a data value of a target attribute corresponding to a root source attribute contained in the hierarchical data model, an action to apply a data value to at least one target attribute corresponding to at least one source attribute contained on a lower level in the hierarchical data model, and an action to apply at least one inherited data value to at least one target attribute, wherein the inherited data value is inherited from at least another target attribute corresponding to at least another source attribute contained on a higher level of the hierarchical data model. In some implementations, the source attribute in the hierarchical data model can be defined by a source attribute value and a source attribute description.

In some implementations, the generated user interface can include at least one of the following: at least one source attribute, the source attribute value corresponding to the source attribute, and the source attribute description corresponding to the source attribute. At least one column in the generated user interface can be used to display at least one of the following: the source attribute, the source attribute value corresponding to the source attribute, and the source attribute description corresponding to the source attribute.

In some implementations, the method can include searching at least one of the following: the at least one source attribute, the source attribute value corresponding to the source attribute, and the source attribute description corresponding to the source attribute. The search can be limited by the hierarchical data model as displayed in the generated user interface.

In some implementations, the method can further include adding and/or removing at least another user setting for displaying the hierarchical data model and the changed target attribute data value without changing coding associated with the generated user interface.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   providing at least one maintenance function to change a first target attribute data value and a second target attribute data value, the first target attribute data value corresponding to at least one a first source attribute stored in a first level of a hierarchical data model and at least one a first instruction corresponding to the at least one first source attribute, the second target attribute data value corresponding to a second source attribute stored in a second level of the hierarchical data model and a second instruction corresponding to the second source attribute, the first level higher than the second level;
   changing, using the at least one maintenance function, at least one the first target attribute data value and the second target attribute data value, wherein the changing the second target attribute data value is based on inherited logic of an instruction of a source attribute stored in a level higher than the second level of the hierarchical data model; and
   generating, based on at least one user setting, a user interface for displaying the hierarchical data model and the changed at least one first and second target attribute data values;
   wherein the at least one of the providing, the changing, and the generating is performed using at least one processor of at least one computing system.

2. The method according to claim 1, wherein the at least one maintenance function includes at least one of the following:
   an action to clear a data value of a target attribute corresponding to a root source attribute contained in the hierarchical data model,
   an action to apply a data value to at least one target attribute corresponding to at least one source attribute contained on a lower level in the hierarchical data model, and
   an action to apply at least one inherited data value to at least one target attribute, wherein the inherited data value is inherited from at least another target attribute corresponding to at least another source attribute contained on a higher level of the hierarchical data model.

3. The method according to claim 1, wherein the first source attribute in the hierarchical data model is defined by a source attribute value and a source attribute description.

4. The method according to claim 3, wherein the generated user interface includes at least one of the following: the first source attribute, the source attribute value corresponding to the first source attribute, and the source attribute description corresponding to the first source attribute.

5. The method according to claim 4, wherein at least one column in the generated user interface is used to display at least one of the following: the first source attribute, the source attribute value corresponding to the first source attribute, and the source attribute description corresponding to the first source attribute.

6. The method according to claim 5, further comprising searching at least one of the following: the first source attribute, the source attribute value corresponding to the first source attribute, and the source attribute description corresponding to the first source attribute.

7. The method according to claim 6, wherein the searching is limited by the hierarchical data model as displayed in the generated user interface.

8. The method according to claim 1, further comprising adding and/or removing at least another user setting for displaying the hierarchical data model and the changed first and second target attribute data value without changing coding associated with the generated user interface.

9. A system comprising:
   at least one programmable processor; and
   a machine-readable medium storing instructions that, when executed by the at least one programmable processor, cause the at least one programmable processor to perform operations comprising:
      providing at least one maintenance function to change a first target attribute data value and a second target attribute data value, the first target attribute data value corresponding to a first source attribute stored in a first level of a hierarchical data model and a first instruction corresponding to the first source attribute, the second target attribute data value corresponding to a second source attribute stored in a second level of the hierarchical data model and a second instruction corresponding to the second source attribute, the first level higher than the second level;

changing, using the at least one maintenance function, the first target attribute data value and the second target attribute data value, wherein the changing the second target attribute data value is based on inherited logic of an instruction of a source attribute stored in a level higher than the second level of the hierarchical data model; and generating, based on at least one user setting, a user interface for displaying the hierarchical data model and the changed first and second target attribute data values.

10. The system according to claim 9, wherein the at least one maintenance function includes at least one of the following:

an action to clear a data value of a target attribute corresponding to a root source attribute contained in the hierarchical data model, an action to apply a data value to at least one target attribute corresponding to at least one source attribute contained on a lower level in the hierarchical data model, and an action to apply at least one inherited data value to at least one target attribute, wherein the inherited data value is inherited from at least another target attribute corresponding to at least another source attribute contained on a higher level of the hierarchical data model.

11. The system according to claim 9, wherein the first source attribute in the hierarchical data model is defined by a source attribute value and a source attribute description.

12. The system according to claim 11, wherein the generated user interface includes at least one of the following: the first source attribute, the source attribute value corresponding to the first source attribute, and the source attribute description corresponding to the first source attribute.

13. The system according to claim 12, wherein at least one column in the generated user interface is used to display at least one of the following: the first source attribute, the source attribute value corresponding to the first source attribute, and the source attribute description corresponding to the first source attribute.

14. The system according to claim 13, wherein the operations further comprise searching at least one of the following: the first source attribute, the source attribute value corresponding to the first source attribute, and the source attribute description corresponding to the first source attribute.

15. The system according to claim 14, wherein the searching is limited by the hierarchical data model as displayed in the generated user interface.

16. The system according to claim 9, wherein the operations further comprise adding and/or removing at least another user setting for displaying the hierarchical data model and the changed first and second target attribute data value without changing coding associated with the generated user interface.

17. A computer program product comprising a non-transitory machine-readable medium storing instructions that, when executed by at least one programmable processor, cause the at least one programmable processor to perform operations comprising:

providing at least one maintenance function to change a first target attribute data value and a second target attribute data value, the first target attribute data value corresponding to a first source attribute stored in a first level of a hierarchical data model and a first instruction corresponding to the first source attribute, the second target attribute data value corresponding to a second source attribute stored in a second level of the hierarchical data model and a second instruction corresponding to the second source attribute, the first level higher than the second level;

changing, using the at least one maintenance function, the first target attribute data value and the second target attribute data value, wherein the changing the second target attribute data value is based on inherited logic of an instruction of a source attribute stored in a level higher than the second level of the hierarchical data model; and generating, based on at least one user setting, a user interface for displaying the hierarchical data model and the changed first and second target attribute data values.

18. The computer program product according to claim 17, wherein the at least one maintenance function includes at least one of the following:

an action to clear a data value of a target attribute corresponding to a root source attribute contained in the hierarchical data model, an action to apply a data value to at least one target attribute corresponding to at least one source attribute contained on a lower level in the hierarchical data model, and an action to apply at least one inherited data value to at least one target attribute, wherein the inherited data value is inherited from at least another target attribute corresponding to at least another source attribute contained on a higher level of the hierarchical data model.

19. The computer program product according to claim 17, wherein the first source attribute in the hierarchical data model is defined by a source attribute value and a source attribute description.

20. The computer program product according to claim 19, wherein the generated user interface includes at least one of the following: the first source attribute, the source attribute value corresponding to the first source attribute, and the source attribute description corresponding to the first source attribute;

wherein at least one column in the generated user interface is used to display at least one of the following: the first source attribute, the source attribute value corresponding to the first source attribute, and the source attribute description corresponding to the first source attribute;

wherein the operations further include, further comprising searching at least one of the following: the first source attribute, the source attribute value corresponding to the first source attribute, and the source attribute description corresponding to the first source attribute, wherein the searching is limited by the hierarchical data model as displayed in the generated user interface.

* * * * *